United States Patent
Laferte et al.

(10) Patent No.: US 10,233,368 B2
(45) Date of Patent: Mar. 19, 2019

(54) TWO-COMPONENT LAMINATION ADHESIVE OF RENEWABLE ORIGIN

(71) Applicant: BOSTIK SA, La Plaine Saint-Denis (FR)

(72) Inventors: Olivier Laferte, Trosly Breuil (FR); Stephane Fouquay, Mont Saint Aignan (FR)

(73) Assignee: BOSTIK SA, La Plaine Saint-Denis (FR)

( * ) Notice: Subject to any disclaimer, the term of this patent is extended or adjusted under 35 U.S.C. 154(b) by 117 days.

(21) Appl. No.: 14/442,332

(22) PCT Filed: Nov. 5, 2013

(86) PCT No.: PCT/FR2013/052634
§ 371 (c)(1),
(2) Date: May 12, 2015

(87) PCT Pub. No.: WO2014/072629
PCT Pub. Date: May 15, 2014

(65) Prior Publication Data
US 2016/0272858 A1 Sep. 22, 2016

(30) Foreign Application Priority Data

Nov. 12, 2012 (FR) ..................................... 12.60749

(51) Int. Cl.

| | | |
|---|---|---|
| *C09J 175/14* | (2006.01) | |
| *B32B 7/12* | (2006.01) | |
| *C08G 18/76* | (2006.01) | |
| *C08G 18/10* | (2006.01) | |
| *C08G 18/66* | (2006.01) | |
| *B32B 27/32* | (2006.01) | |
| *B32B 27/36* | (2006.01) | |
| *C08G 18/48* | (2006.01) | |
| *C08G 18/12* | (2006.01) | |
| *C11C 3/00* | (2006.01) | |
| *C08G 18/36* | (2006.01) | |
| *C08G 18/42* | (2006.01) | |
| *C09J 175/04* | (2006.01) | |

(52) U.S. Cl.
CPC ............... *C09J 175/14* (2013.01); *B32B 7/12* (2013.01); *B32B 27/32* (2013.01); *B32B 27/36* (2013.01); *C08G 18/10* (2013.01); *C08G 18/12* (2013.01); *C08G 18/36* (2013.01); *C08G 18/4288* (2013.01); *C08G 18/4891* (2013.01); *C08G 18/6607* (2013.01); *C08G 18/6629* (2013.01); *C08G 18/7657* (2013.01); *C08G 18/7671* (2013.01); *C09J 175/04* (2013.01); *C11C 3/003* (2013.01); *B32B 2250/02* (2013.01); *B32B 2255/26* (2013.01); *B32B 2405/00* (2013.01); *B32B 2553/00* (2013.01)

(58) Field of Classification Search
CPC ........ C08G 18/10; C08G 18/12; C08G 18/36; C08G 18/307; C08G 18/4288; C08G 18/4891; C08G 18/6607; C08G 18/6629; C08G 18/7657; C08G 18/7671; B32B 2250/02; B32B 2255/26; B32B 2405/00; B32B 2553/00; B32B 27/32; B32B 27/36; B32B 7/12; C09J 175/04; C09J 175/14; C11C 3/003
USPC ............ 428/423.1; 156/307.3, 331.4; 528/65
See application file for complete search history.

(56) References Cited

U.S. PATENT DOCUMENTS

| | | |
|---|---|---|
| 4,535,142 A | 8/1985 | Brauer et al. |
| 2006/0182957 A1 | 8/2006 | Simons et al. |
| 2012/0208957 A1 | 8/2012 | Berard et al. |
| 2013/0005936 A1 | 1/2013 | Cramail et al. |

FOREIGN PATENT DOCUMENTS

| | | |
|---|---|---|
| WO | 2011002975 A1 | 1/2011 |
| WO | 2011030075 A1 | 3/2011 |

OTHER PUBLICATIONS

International Search Report for PCT/FR2013/052634 dated Jan. 30, 2014.

*Primary Examiner* — Thao T Tran
(74) *Attorney, Agent, or Firm* — Millen, White, Zelano and Branigan, P.C.

(57) ABSTRACT

Two-component lamination adhesive, having a —NCO component obtained by reacting a polyisocyanate with a composition of diols, a multilayer film comprising an adhesive layer composed of said lamination adhesive, a process for the preparation of said film, and use of said film in the manufacture of flexible packagings.

17 Claims, No Drawings

TWO-COMPONENT LAMINATION ADHESIVE OF RENEWABLE ORIGIN

A subject matter of the present invention is an adhesive composition of solvent-free two-component polyurethane type which is suitable for the lamination of thin layers of materials, in particular polymer and/or metal materials. It also relates to a multilayer film comprising at least two thin layers of said materials bonded together by said crosslinking adhesive composition and also to the use of said system in the manufacture of flexible packagings.

The flexible packagings intended for the packaging of the most diverse products, such as those manufactured by the food processing, cosmetics or detergents industries, are generally composed of several thin layers (in the form of sheets or films), the thickness of which is between 5 and 150 µm, which are composed of different materials, such as paper, a metal (for example aluminum) or also thermoplastic polymers. The corresponding complex (or multilayer) film, the thickness of which can vary from 20 to 400 µm, makes it possible to combine the properties of the different individual layers of material and to thus provide the consumer with a combination of characteristics suitable for the final flexible packaging, such as, for example:
- its visual appearance (in particular that of the printed elements presenting the information relating to the packaged product and intended for the consumer),
- a barrier effect to atmospheric moisture or to oxygen,
- contact with food without risk of toxicity or of modification to the organoleptic properties of the packaged foodstuffs,
- chemical resistance for certain products, such as ketchup or liquid soap,
- good behavior at high temperature, for example in the case of pasteurization.

In order to form the final packaging, the multilayer film is generally shaped by heat sealing at a temperature varying from approximately 120 to 250° C., the latter technique also being used for closing the packaging around the product intended for the consumer.

The various layers of materials of which the multilayer film is composed are combined or assembled by laminating during industrial lamination processes.

These processes employ adhesives or devices (or machines) designed for this purpose. The multilayer film thus obtained is often itself described by the term of "laminated".

These processes first of all comprise a stage of coating the adhesive over a first film of material, which consists of the deposition of a continuous layer of adhesive with a controlled thickness generally of less than 10 µm, corresponding to an amount of adhesive (or grammage) which is also controlled, generally not exceeding 10 g/m². This coating stage is followed by a stage of laminating a second film of material, identical to or different from the first, consisting of the application, under pressure, of this second film to the first film covered with the layer of adhesive.

Laminating adhesives of solvent-free two-component polyurethane type are widely used as adhesive in the manufacture of multilayer systems intended for the field of flexible packaging. This is because these adhesives, which comprise neither organic solvent nor water, exhibit the advantage of being able to be employed in industrial laminating operations at very high line speeds. This is due precisely to the fact that there is no organic solvent or water to be removed, which thus avoids an additional stage of removal by passing the complex through an oven, or by another means.

The lamination adhesives of solvent-free two-component polyurethane type are supplied to the laminator in the form of 2 compositions (or components):
- one (known as —NCO component) comprising chemical entities carrying isocyanate end groups, and
- the other (known as —OH component) comprising chemical entities carrying hydroxyl end groups.

The mixing of these 2 components is carried out under hot conditions at a temperature of between 40 and 80° C. by the operator of the laminating machine, prior to starting it up, and makes possible, by virtue of an appropriate viscosity, the correct operation of the machine.

On conclusion of the coating of the mixture thus obtained and of the laminating operation, the isocyanate groups of the —NCO component react with the hydroxyl groups of the —OH component, according to a reaction referred to as crosslinking, to form a polyurethane which exists in the form of a three-dimensional network comprising urethane groups, providing the cohesion of the adhesive seal between the 2 thin laminated layers. The time required to complete this crosslinking reaction and to thus provide the required level of cohesion is generally of the order of 3 to 10 days.

The complex films manufactured according to this type of process are highly suitable for the manufacture of flexible (or soft) packagings due to their excellent level of cohesion.

The chemical entities present in the —NCO component are generally polymeric chemical compounds (often known as prepolymers as they are precursors of the constituent final crosslinked polyurethane of the adhesive seal) and are generally themselves polyurethanes produced by the reaction of a diisocyanate in excess with polyether polyols and/or polyester polyols, all these reactants being manufactured from starting materials of petroleum origin.

The chemical entities present in the —OH component are polymeric or nonpolymeric chemical compounds, sometimes of natural origin (such as castor oil), which generally include polymers of polyether polyol and/or polyester polyol type, with a molar mass of between 400 and 4000 Da, which are also often manufactured from starting materials of petroleum origin.

In point of fact, in the current context of the development of a "green" chemistry, there is an increasing search to dispense with, or at the very least to reduce the portion of, nonrenewable starting materials of petroleum or fossil origin to the advantage of renewable starting materials of vegetable or animal origin.

The application US 2006/0182957 describes a lamination adhesive of two-component polyurethane type in which one of the components is obtained (or comprises a derivative obtained) from a transesterification reaction of a fatty acid triglyceride, such as oils or fatty substances of animal or vegetable origin, with a polyalcohol comprising at least 3 hydroxyl groups.

The application PCT WO2011/030075 describes diols of ricinoleate and polyricinoleate type prepared from castor oil and their reaction with isocyanates. This document does not in any way envisage a two-component lamination adhesive being obtained.

The aim of the present invention is to provide a novel lamination adhesive of two-component polyurethane type having the required cohesion properties, the —NCO component of which is obtained by a process employing more renewable starting materials.

A subject matter of the present invention is thus, first, a solvent-free two-component lamination adhesive comprising an —NCO component and an —OH component, characterized in that the —NCO component is obtained by reacting, according to a polyaddition reaction, a stoichiometric excess of an aromatic or aliphatic polyisocyanate (A) with a composition formed of diols (B) comprising, on the basis of the total weight of said composition:

from 60 to 100% weight/weight of a composition (B1) composed of one or more di(polyricinoleate) diols having a hydroxyl number $N_{OH}$ of between 30 and 70 mg KOH/g and the formula (I):

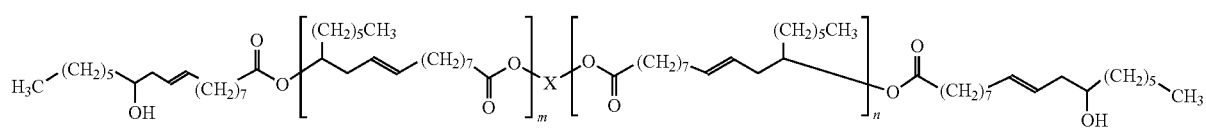

in which:

A represents a divalent hydrocarbon radical optionally interrupted by one or more heteroatoms chosen from oxygen or sulfur;

m and n, which are identical or different, represent 0 or an integer ranging from 1 to 11 and are such that m+n varies from 0 to 11; and from 0 to 40% weight/weight of a composition (B2) composed of diols having an $N_{OH}$ of between 72 and 360 mg KOH/g and which are chosen from:

dimerized fatty alcohols comprising from 20 to 44 carbon atoms, and di(polyricinoleate) diols having the formula (II):

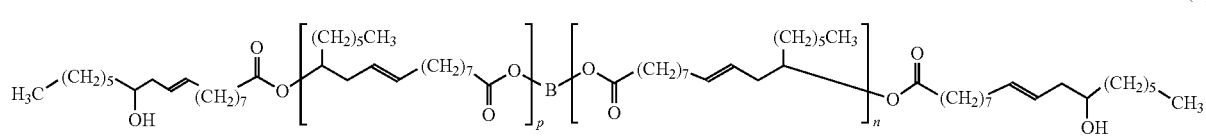

in which:

B represents a radical as defined above for A which is identical to or different from the radical represented by A;

p and q, which are identical or different, represent 0 or an integer ranging from 1 to 3 and are such that p+q varies from 0 to 3.

The polyricinoleates making up (B1) and, if appropriate, (B2) are obtained from ricinoleic acid esters, themselves prepared from castor oil. Thus, the —NCO component included in the two-component lamination adhesive according to the invention is advantageously obtained from a renewable starting material.

Furthermore, the viscosity of said —NCO component is such that it makes it possible, after mixing with an appropriate —OH component, to obtain, in the feed tanks of industrial laminating machines, a composition which is appropriate in terms of viscosity, more particularly a composition exhibiting a Brookfield viscosity at 40° C. within the range extending from 500 to 2000 mPa·s, preferably from 500 to 1500 mPa·s.

Said lamination adhesive also makes it possible to obtain a cohesion between the two layers of materials which is comparable with that provided by the products of petroleum origin known from the prior art. Finally, this cohesion is advantageously maintained at high temperature, more particularly in a range extending from 60 to 90° C., which makes it possible to use the flexible packagings obtained from the adhesive for pasteurization treatments of foodstuffs.

Composition (B1):

The composition (B1) formed of di(polyricinoleate) diols of formula (I) is advantageously prepared from castor oil.

Castor oil is a vegetable oil which is obtained from castor seeds and is composed of triglycerides (triple esters of glycerol and of fatty acids), said fatty acids comprising, for approximately 90% by weight, a monounsaturated and hydroxylated C18 fatty acid: ricinoleic acid.

The triglyceride of ricinoleic acid has the formula (III):

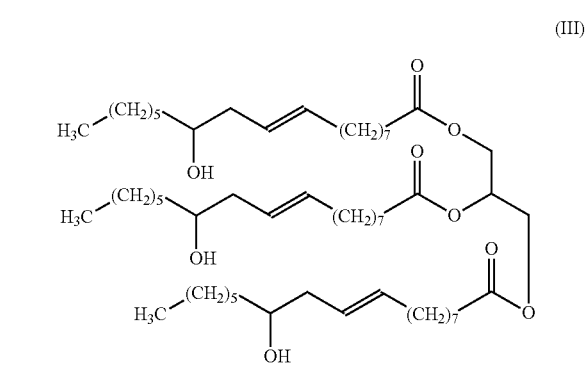

A description is given below of a process for the preparation of the composition (B1) comprising the di(polyricinoleate) diols of formula (I).

In a 1st stage a), the castor oil is reacted with an alcohol of formula R'OH, in which $R^1$ represents a $C_1$-$C_4$ alkyl radical, preferably methyl, according to a transesterification reaction, so as to obtain a composition comprising the ricinoleic acid monoester of formula (IV):

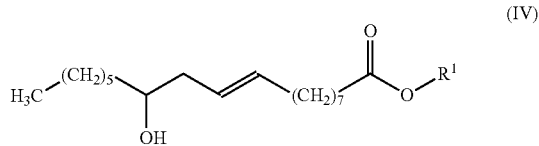
(IV)

in which $R^1$ has the same meaning as above.

The reaction is advantageously carried out in the presence of a transesterification catalyst and by heating at a temperature of between 50 and 90° C.

In a 2nd stage b), starting from the compound of formula (IV) included in the composition obtained, an oligomerization reaction is carried out in which the ester functional group of one molecule of said compound is transesterified by the —OH functional group carried by the carbon of another molecule of this same compound, to form a composition comprising at least approximately 80% by weight of polyricinoleates of formula (V), also known as castor estolides:

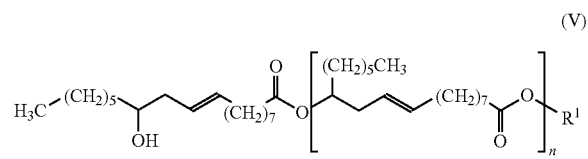
(V)

in which n is as defined above.

Preferably, this stage is carried out at a temperature of between 100 and 220° C., under reduced pressure of approximately 10 mbar and in the presence, as transesterification catalyst, of sodium methoxide MeONa.

In a 3rd stage c), the composition (B1) formed of di(polyricinoleate) diols of formula (I) is obtained by reacting, according to a further transesterification reaction, the compounds of formula (V) included in the composition obtained above with one or more compounds of formula (VI):

HO-A-OH (VI)

in which A is as defined above.

Preferably, this stage c) is carried out in the presence of the transesterification catalyst and at a temperature of between 90 and 200° C. for a reduced pressure of approximately 10 mbar.

The transesterification catalysts employed in the process which has just been described are those normally used and are preferably chosen from the group consisting of magnesium oxide, zinc acetate, titanium tetraalkoxide (such as titanium tetrabutoxide) and sodium methoxide.

For further details relating to this process, reference is made to the application WO 2011/030075.

Stages b) and c) are carried out either sequentially or simultaneously, in this case by directly reacting the compound of formula (IV) with the diol(s) of formula (VI).

The hydroxyl number $N_{OH}$ is the number of moles of hydroxyl functional group present per gram of composition formed of polyricinoleate diols (B1). This number is expressed in the form of the equivalent number of milligrams of KOH, measured experimentally to neutralize acetic acid, which combines with 1 g of composition (B1) by acetylation reaction.

The di(polyricinoleates) of formula (I) thus obtained as a mixture in the composition (B1) carry 2 —OH functional groups and are thus very liable to react with compounds terminated by —NCO groups.

Some compositions formed of di(polyricinoleate) diols covered by the definition of (B1) are commercially available. Mention may thus be made of:

Polycin® XP D-2000, available from Vertellus Performance Materials Inc., the $N_{OH}$ of which is equal to 55;

Polycin® GR-35, also available from Vertellus Performance Materials Inc., the $N_{OH}$ of which is equal to 38.

The divalent hydrocarbon radical A can be saturated or unsaturated, linear or branched, acyclic or cyclic and of aliphatic or aromatic nature and advantageously corresponds to a diol of formula (VI), each of the 2 —OH functional groups of which is replaced with a single bond and the hydroxyl number $N_{OH}$ of which is within the range extending from 110 to 1808 mg KOH/g.

According to a preferred alternative form of the invention, the divalent radical A corresponds to a diol of the formula HO-A-OH (VI) chosen from:

(a) ethylene glycol ($N_{OH}$=1808 mg KOH/g);
(b) 1,4-butanediol ($N_{OH}$=1245 mg KOH/g);
(c) diethylene glycol ($N_{OH}$ equal to 1060 mg KOH/g);
(d) 1,4-cyclohexanedimethanol ($N_{OH}$=778 mg KOH/g);
(e) a PolyPropylene Glycol with a molar mass ranging from 400 g/mol ($N_{OH}$ equal to 281 mg KOH/g) to 1000 g/mol ($N_{OH}$ equal to 112 mg KOH/g); or
(f) an aliphatic dimerized fatty alcohol comprising from 20 to 44 carbon atoms, hereinafter referred to as compound (D) ($N_{OH}$ of between 176 and 357 mg KOH/g).

Such compounds can advantageously be prepared from natural and renewable starting materials.

According to a preferred alternative form of the invention, the divalent radical A of the compounds of formula (I) included in the composition (B1) corresponds to an aliphatic dimerized fatty alcohol (f) comprising from 20 to 44 carbon atoms and more particularly preferably comprising from 35 to 37 carbon atoms.

According to another, also preferred, alternative form of the invention, the divalent radical A corresponds to a PolyPropylene Glycol with a molar mass ranging from 400 to 1000 g/mol and very particularly to a PolyPropylene Glycol with a molar mass of 400 g/mol.

The abovementioned dimerized fatty alcohols (f) are obtained, in the form of a composition, by hydrogenation of an unsaturated fatty acid dimer (in the acid or ester form), said fatty acid comprising from 10 to 22 carbon atoms and from 1 to 3 double bonds. Mention may be made, as example of such a fatty acid, of oleic, linoleic, palmitoleic, linolenic, eleostearic, ricinoleic, vernolic, licanic, myristoleic, margaroleic, gadoleic, eicosadienoic and/or erucic acid.

These unsaturated fatty acids are present in the form of triglycerides in numerous vegetable oils, such as pine, rapeseed, corn, sunflower, soybean, linseed, coconut, jojoba or grape seed oil. They are extracted therefrom, for example by transesterification of the corresponding triglycerides with methanol.

The methyl esters of unsaturated fatty acids thus obtained as a mixture are then oligomerized by heating according to a condensation reaction on the double bonds, which results in the formation of mixtures of dimer and trimer compounds of methyl esters of fatty acids. Dimers or trimers of methyl esters of fatty acids is understood to denote oligomers of 2 or 3 monomers, which are identical or different, respectively carrying 2 or 3 ester functional groups.

The dimers of methyl esters are then obtained by distillation of the latter mixtures and are then subjected to a catalytic hydrogenation, resulting in the reduction of the 2 ester functional groups to give —OH functional groups, to form the dimerized fatty alcohol (f), generally in the form of a composition.

Such dimers (f) are also commercially available. Mention may thus be made thereof, as example, of a composition formed of dimerized fatty alcohols comprising from 35 to 37 carbon atoms and exhibiting an $N_{OH}$ of between 202 and 212 mg KOH/g (M between 529 and 556 g) which is sold under the names Pripol® 2033 by Croda and Sovermol® 908 by Cognis.

According to another preferred alternative form of the invention, the di(polyricinoleate) diols constituting the composition (B1) have a hydroxyl number $N_{OH}$ of between 35 and 65 mg KOH/g.

Composition (B2):

The dimerized fatty alcohols comprising from 20 to 44 carbon atoms which constitute one of the alternative forms of the composition (B2) are as defined above for the compound (f) and constitute a preferred alternative form.

More preferably still, the composition (B2) is composed of a composition formed of dimerized fatty alcohols comprising from 35 to 37 carbon atoms, corresponding to an $N_{OH}$ of between 202 and 212 mg KOH/g. Said composition is commercially available under the name of Pripol® 2033.

Advantageously, the composition formed of diols (B) comprises from 70 to 100% weight/weight of (B1) and from 0 to 30% weight/weight of (B2). More advantageously still, the composition formed of diols (B) comprises from 75 to 100% weight/weight of (B1) and from 0 to 25% weight/weight of (B2).

The composition (B), when it comprises the compositions (B1) and (B2), is obtained by simple mixing of these compositions.

The —NCO component of the lamination adhesive according to the invention is obtained by reacting, with the composition formed of diols (B), a stoichiometric excess of an aromatic or aliphatic polyisocyanate (A).

Said polyisocyanate (A) is generally chosen from aromatic polyisocyanates, such as 2,4'- or 4,4'-diphenylmethane diisocyanate (or MDI) and toluene diisocyanate (TDI), aliphatic polyisocyanates, such as hexamethylene diisocyanate (HMDI), alicyclic polyisocyanates, such as isophorone diisocyanate (IPDI), modified polyisocyanates, for example obtained by reaction with trimethylolpropane, water or by cyclization, and the mixtures of one or more of these compounds.

Preferably, use is made of aromatic polyisocyanates and more particularly of MDI.

The use of a stoichiometric excess of the polyisocyanate (A) means that use is made of an excess of the equivalent number of —NCO groups (present in the amount of polyisocyanate) with respect to the equivalent number of —OH groups (present in the total amount of composition (B)).

Preferably, these amounts correspond to an —NCO/—OH equivalent ratio of between 2 and 10, more preferably still between 2.5 and 6.5. The amounts by weight of (A) and (B) to be charged to the reactor are determined on the basis of this ratio and also, as concerns the composition (B), with regard to its hydroxyl number $N_{OH}$, measured experimentally or calculated from the $N_{OH}$ values of (B1) and (B2) and from their respective contents by weight in (B).

In addition to the —NCO component described above, the two-component lamination adhesive according to the invention also comprises an —OH component.

Preferably, the —OH component is a composition comprising at least approximately 80% by weight of ricinoleic acid triglyceride advantageously obtained from castor oil.

The —NCO and —OH components are advantageously present in the lamination adhesive according to the invention in an amount corresponding to an —NCO/—OH molar ratio equal to approximately 2.

The invention also relates to a multilayer (or complex) film comprising 2 thin layers of material bonded to one another by a continuous layer, characterized in that said layer is composed of the two-component lamination adhesive according to the invention in the crosslinked state, in a proportion of an amount of less than 10 g/m².

According to an alternative form of the invention, said amount is less than or equal to 7 g/m² and preferably ranges from 0.5 to 2 g/m².

The materials of which the thin layers surrounding the adhesive layer are composed are generally chosen from paper, a metal, such as, for example, aluminum, or thermoplastic polymers, such as:
  polyethylene (PE),
  polypropylene (PP),
  a copolymer based on ethylene and on propylene,
  polyamide (PA),
  polyethylene terephthalate (PET), or also
  an ethylene-based copolymer, such as, for example, a copolymer grafted with maleic anhydride, a copolymer of ethylene and of vinyl acetate (EVA), a copolymer of ethylene and of vinyl alcohol (EVOH) or a copolymer of ethylene and of an alkyl acrylate, such as methyl acrylate (EMA) or butyl acrylate (EBA),
  polystyrene (PS),
  polyvinyl chloride (PVC),
  polyvinylidene fluoride (PVDF),
  a polymer or copolymer of lactic acid (PLA), or
  a polyhydroxyalkanoate (PHA).

The thicknesses of the 2 thin layers adjacent to the adhesive layer and of the other layers employed in the multilayer film according to the invention are capable of varying within a wide range extending from 5 to 150 µm. The total thickness of said film is also capable of varying within a wide range extending from 20 to 400 µm.

The invention also relates to a process for the continuous preparation of the multilayer film according to the invention, comprising the sequential stages of:
(i) combining the —NCO and —OH components in the form of an adhesive mixture rendered flowable by heating to an appropriate temperature,
(ii) coating, with said adhesive mixture, a first thin layer of material in the form of a substantially continuous layer,
(iii) laminating a second thin layer over the first thin layer coated in accordance with stage (ii), then
(iv) crosslinking the adhesive mixture.

Finally, the invention relates to the use of the multilayer film according to the invention in the manufacture of flexible packagings. This is because the complex films according to the invention can be used for the manufacture of the most diverse flexible packagings, which are shaped and then closed (after the stage of packaging the product intended for the consumer) by heat sealing techniques.

The invention is now described in the following implementational examples, which are given purely by way of illustration and should not be interpreted in order to limit the scope thereof.

EXAMPLE A (REFERENCE)

Preparation of a Composition (B1) Comprising Di(Polyricinoleate) Diols of Dimerized Fatty Alcohols with 35 to 37 Carbon Atoms, of Formula (I)

A description is given below of the preparation of a composition (B1) which comprises diols of formula (I) in which the divalent radical A corresponds to a dimerized fatty alcohol (diol) comprising 35 to 37 carbon atoms in which each of the 2 —OH functional groups is replaced by a free valence.

1st Stage: Preparation of the Methyl Ricinoleate (Formula (IV) in which $R^1$ is a Methyl Radical):

16 980 g of castor oil (content of ricinoleic acid triglyceride of approximately 89% by weight, average molar mass of 928 g/mol, water content equal to 0.35% by weight) with 4393 g of methanol and 454.12 g of MeONa are introduced into a 30-liter jacketed reactor. The combination is heated to 75° C. and maintained at this temperature for 2 hours, and then the reaction medium is cooled to 40° C.

The resulting reaction mixture is subsequently left to separate by settling and then several washing operations are carried out with water in order to remove the glycerol.

15 990 g of a composition comprising approximately 89% by weight of methyl ricinoleate are obtained.

2nd Stage: Reaction with a Composition Formed of Dimerized Fatty Alcohols Comprising from 35 to 37 Carbon Atoms:

Use is made, as composition formed of dimerized fatty alcohols which comprise from 35 to 37 carbon atoms, of a sample of the Pripol® 2033 product sold by Croda, which exhibits an $N_{OH}$, determined by titrimetry, of 207 mg KOH/g and which is of 100% renewable origin.

1875 g (6 mol) of the composition obtained in the 1st stage, 542 g (1 mol) of Pripol® 2033 and 24 g of Ti(OBu)$_4$ (1% by weight of the mixture of the reactants) are introduced into a 5-liter reactor and heated up to 90° C. over 30 minutes with slight bubbling of nitrogen. The reaction medium is subsequently brought up to 200° C. under a nitrogen blanket, with mechanical stirring and under a partial vacuum of 10 mbar in order to remove the methanol generated. The condensation (transesterification) reaction is continued for approximately 6 hours until a composition exhibiting a hydroxyl number of 50.5 mg KOH/g is obtained.

Once the reaction is complete, the reaction medium is cooled to approximately 85° C. and the medium is filtered in order to remove the residual catalyst Ti(OBu)$_4$.

2180 g of a composition which comprises at least approximately 80% of compounds of formula (I) are obtained in the form of a yellow liquid which is viscous at ambient temperature and which is of 100% renewable origin.

EXAMPLE B (REFERENCE)

Preparation of a Composition (B1) Comprising Di(Polyricinoleate) Diols of a Polypropylene Glycol with a Molar Mass of 400 g/Mol, of Formula (I)

A description is given below of the preparation of a composition (B1) comprising diols of formula (I) in which A is a poly(oxypropylene) radical which corresponds to a polypropylene glycol with a molar mass of 400 g/mol without the end —OH functional groups, of 100% fossil origin.

1st Stage: Preparation of the Methyl Ricinoleate (Formula (IV) in which $R^1$ is a Methyl Radical):

The 1st stage of example A is repeated.

2nd stage: Reaction with a polypropylene glycol with a molar mass of 400 g/mol:

1562 g (5 mol) of methyl ricinoleate, 400 g (1 mol) of a polypropylene glycol with a molar mass of 400 g/mol and 21 g of Ti(OBu)$_4$ (1% by weight of the mixture of the reactants) are introduced into a 5-liter jacketed reactor and heated up to 90° C. over 30 minutes with slight bubbling of nitrogen. The reaction medium is subsequently brought up to 200° C. under a nitrogen blanket, with mechanical stirring and under a partial vacuum of 10 mbar in order to remove the methanol generated. The condensation reaction is continued for approximately 6 hours until a hydroxyl number of 59.7 mg KOH/g is obtained.

Once the reaction is complete, the reaction medium is cooled to approximately 85° C. and the medium is filtered in order to remove the residual catalyst Ti(OBu)$_4$.

1766 g of a composition which comprises at least approximately 80% of compounds of formula (I) are obtained in the form of a yellow liquid which is viscous at ambient temperature and which is thus of 80% renewable origin.

EXAMPLE 1

Two-component Lamination Adhesive Having, as —NCO Component, the Reaction Product of Diphenylmethane Diisocyanate (Hereinafter MDI) with a Composition (B) Consisting of the Composition (B1) of Example A 1.1. Preparation of the —NCO Component:

Use is made of a sample of a mixture of 4,4' and 2,4' isomers of MDI (in a proportion respectively of approximately 50%/50% by weight) which titrates 33.5% weight/weight of —NCO group, which has a molar mass of 250 g/mol and which is 100% a product of petroleum origin and thus of fossil origin.

100 g of the composition of example A (corresponding to an equivalent number of —OH functional group equal to 0.90 mmol/g) are introduced, under a stream of nitrogen and at ambient temperature, into a closed 250 ml reactor equipped with a stirrer, heating means and a thermometer and connected to a vacuum pump. The combination is heated to 80° C. and maintained at a reduced pressure of 20 mbar for 1 hour in order to dehydrate the diols.

71.8 g of MDI (corresponding to a number of —NCO functional groups equal to 7.98 mmol/g) are then introduced under a stream of nitrogen.

The amounts introduced by weight thus correspond to an NCO/OH equivalent molar ratio equal to 6.4 (cf. table 1). The combination is maintained at reduced pressure of 20 mbar and at 70° C. for 3 hours until the hydroxyl functional groups of the diols of the composition of example A have been completely consumed, corresponding to an —NCO content (monitored by potentiometric titration) of 11.8% weight/weight (cf. table 1).

171.8 g of polyurethane are obtained, the content of —NCO group of 11.8% weight/weight of which corresponds to a content of 2.81 mmol/g.

1.2. Preparation of the Two-Component Lamination Adhesive:

Use is made, as —OH component, of a castor oil having a mean $N_{OH}$ of 162 mg KOH/g.

The —NCO component prepared in § 1.1. is mixed with the —OH component in a proportion of an —NCO/—OH molar equivalent ratio equal to 2.1, which corresponds by weight to a mixture of 100 g of —NCO compound per 46.3 g of —OH component (in view of the content by weight of —NCO group of the —NCO component prepared in § 1.1.).

The mixing is carried out at a temperature of 40° C. in the feed tank of the laminating machine described in point 1.4. below. The Brookfield viscosity at 40° C. of the composition obtained is measured: the value obtained is shown in table 1.

1.3. Calculation of the Content of Renewable Starting Materials:

The content of renewable starting materials is defined as being the total weight of ingredients of renewable origin participating in the preparation of the two-component lamination adhesive, with respect to 100 g of said adhesive.

In order to calculate this content, the reasoning is based on 100 g of composition (B) consisting in the case in point of the composition (B1) of example A (which is of 100% renewable origin). 71.8 g of MDI, which is an ingredient of 100% fossil origin and the weight of which is calculated by using the $N_{OH}$ of said composition A and the NCO/OH equivalent molar ratio shown in table 1, are added to these 100 g. 171.8 g of —NCO component are thus formed.

It is necessary to also add an amount, as —OH component, of castor oil (ingredient of 100% renewable origin) equal to 79.5 g to this 171.8 g of —NCO component, so as to observe the NCO/OH molar equivalent ratio of 2.1.

There is thus obtained 171.8+79.5 g of NCO and OH two-component product, which comprises a weight of ingredient of renewable origin equal to 100 g of composition (B) and 79.5 g of —OH component, hence the ratio of 71% shown in table 1.

1.4. Preparation of 2 Complex Bilayer Films A and B:

The two-component mixture obtained in § 1.2. is used in the manufacture:

- of a bilayer A, the 1st layer of which is composed of an oriented polypropylene film with a thickness of 20 μm and the 2nd layer of which is composed of a metalized oriented polypropylene film with a thickness of 18 μm; and
- of a bilayer B, the 1st layer of which is composed of a PET (PolyEthylene Terephthalate) film with a thickness of 12 μm and the 2nd layer of which is composed of a PET film with a thickness of 50 μm.

Use is made, for this, of a laminating machine of Nordmeccanica type provided with a coating device of roll type with an open tank operating at a temperature of 40° C. and at a rate of forward progression of 50 m/minute; the adhesive layer binding the 2 films of the bilayers A and B exhibits a thickness of approximately 2 μm and the adhesive layer of the bilayer A is in contact with the metalized face of the corresponding polypropylene film.

1.5. Measurement of the Cohesion of the Bilayer Film A at Ambient Temperature:

In order to complete the crosslinking reaction between the —NCO and —OH components of the two-component adhesive, the bilayer film A obtained in § 1.4. is placed for 10 days in a climate-controlled chamber maintained at a temperature of 23° C. and a relative humidity of 50%.

Said bilayer is subsequently brought back to ambient temperature and then subjected to the 180° peel test in accordance with § 1.7.

The result obtained is shown in table 1.

1.6. Measurement of the Cohesion of the Bilayer Film B Before and after the Pasteurization Test:

The protocol of § 1.5. is repeated on the bilayer film B: the result of the 180° C. peel test, carried out on a sample of said film, is shown in table 1 under the designation "before pasteurization".

The same bilayer B is subsequently placed in an oven at 90° C. for 1 hour (test representative of a pasteurization treatment) and a 180° C. peel test is again carried out on a fresh sample of said film, the result of which is shown in table 1 under the designation "after pasteurization".

1.7. Description of the 180° Peel Test:

The cohesion of the bilayer film is evaluated by the 180° peel test as described in the French standard NF T 54-122. The principle of this test consists of the determination of the force necessary for the separation (or peeling) of 2 individual layers of films bonded by the two-component adhesive.

A test specimen of rectangular shape with a width of 15 mm and a length of approximately 10 cm is cut out from the bilayer film. The two individual layers of film included in this strip are manually detached from the end of this test specimen and over approximately 2 cm, and the 2 free ends thus obtained are attached to two fastening devices respectively connected to a stationary portion and a movable portion of a tensile testing device which are located on a vertical axis.

While a drive mechanism imparts, to the movable portion, a uniform rate of 100 mm/minute, resulting in the detachment of the 2 layers, the detached ends of which move gradually along a vertical axis with a formation of an angle of 180°, the stationary portion, connected to a dynamometer, measures the force endured by the test specimen thus held, which force is measured in newtons.

EXAMPLES 2-5 (ACCORDING TO THE INVENTION) AND 6-7 (COMPARATIVE)

Preparation of the —NCO Component

The protocol of § 1.1. is repeated for each composition (B) of table 1, the amounts of reactants being adjusted so as to obtain the NCO/OH equivalent molar ratio shown in table 1. In the case of a composition (B) composed of 2 compositions ((B1) and (B2)), the hydroxyl number $N_{OH}$ of (B) is obtained by calculating the mean of the $N_{OH}$ of (B1) and (B2), weighted by the contents by weight of (B1) and (B2) in (B).

The content by weight of —NCO group of the —NCO component obtained is shown in table 1.

Preparation of the Two-component Lamination Adhesive, of the Bilayer Films A and B and their Characterization:

The protocol of § 1.2. for the preparation of the two-component lamination adhesive is repeated, an —NCO component/—OH component molar equivalent ratio which is fixed and equal to 2.1 being maintained and the corresponding amounts by weight being calculated by taking into account the content by weight of —NCO group of the —NCO component shown in table 1.

As concerns the calculation of the content of renewable starting materials, the mass balance carried out in § 1.3. is adapted to the (B1) and (B2) contents of the composition (B), taking into account the fact that the composition of example B is of 80% renewable origin and that the Pripol® 2033 is of 100% renewable origin.

The protocols of § 1.4. to 1.7. are also repeated.
The results obtained are collated in table 1.

EXAMPLE 8 (REFERENCE)

—NCO Component

Use is made of the —NCO component of a two-component lamination adhesive manufactured from starting materials of petroleum origin and sold by Bostik under the name MP830. The content by weight of —NCO group of said component is 14%.
Preparation of the Two-component Lamination Adhesive, the Bilayer Films A and B and their Characterization:
The protocols of § 1.2. to 1.7. are repeated.
A Brookfield viscosity at 40° C. of 640 mPa·s is measured for the mixture of the —NCO and —OH components.
The content of renewable starting materials is: 35.5%.
The value obtained in the 180° peel test on the bilayer A is 0.93 N.
The value obtained in the 180° peel test on the bilayer B before pasteurization is 4.7 N.
The value obtained in the 180° peel test on the bilayer B after pasteurization is 2.8 N.

The lamination adhesives of examples 1 to 5 according to the invention exhibit a content of renewable starting materials which is advantageously much greater than that of reference example 8, while making possible the preparation of bilayer films which exhibit a comparable cohesion.

The mixture of the —NCO and —OH components corresponding to comparative examples 6 and 7 is not suitable, due to its viscosity at 40° C., for use as lamination adhesive.

The invention claimed is:
1. A two-component lamination adhesive comprising an —NCO component and an —OH component, wherein the —NCO component is obtained by reacting, according to a polyaddition reaction, a stoichiometric excess of an aromatic or aliphatic polyisocyanate (A) with a composition (B) formed of diols comprising, on the basis of the total weight of said composition:
from 60 to 100% by weight of a composition (B1) comprising one or more di(polyricinoleate) diols having a hydroxyl number $N_{OH}$ of between 30 and 70 mg KOH/g and formula (I):

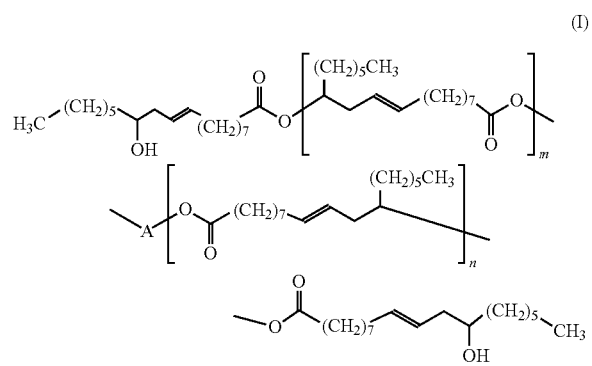

in which:
A represents a divalent hydrocarbon radical optionally interrupted by one or more oxygen or sulfur heteroatoms;
m and n, which are identical or different, represent 0 or an integer ranging from 1 to 11 and are such that m+n varies from 0 to 11; and
from 0 to 40% by weight of a composition (B2) comprising diols having an $N_{OH}$ of between 72 and 360 mg KOH/g and which are:

TABLE 1

| | | Ex. 1 | Ex. 2 | Ex. 3 | Ex. 4 | Ex. 5 | Ex. 6 (comp.) | Ex. 7 (comp) |
|---|---|---|---|---|---|---|---|---|
| | Composition (B1): | | | | | | | |
| Composition (B) (content as weight %) | Example A | 100% | 80% | | | | | 50% |
| | Example B | | | 80% | | | | |
| | Polycin ® XP D-2000 | | | | 80% | | | |
| | Polycin ® GR-35 | | | | | 80% | | |
| | Composition (B2): | | | | | | | |
| | Pripol ® 2033 | | 20% | 20% | 20% | 20% | 100% | 50% |
| —NCO Component | NCO/OH equivalent molar ratio | 6.4 | 4.2 | 4.2 | 4.2 | 4.2 | 2.7 | 3.3 |
| | Content of —NCO group (weight %) | 11.8% | 11.7% | 13.9% | 11.7% | 12.0% | 11.6% | 11.4% |
| Mixture of the —NCO and —OH components | Viscosity at 40° C. (mPa · s) | 930 | 1000 | 400 | 1100 | 1000 | 3300 | 2300 |
| | Content of renewable starting materials | 71% | 69% | 61% | 69% | 69% | 61% | 65% |
| 180° Peeling on bilayer (in N/15 mm) | Film A | 0.94 | 0.93 | 1.2 | 0.78 | 0.77 | NC** | NC** |
| | Film B before pasteurization | 3.7 | 4.1 | ND* | 4.0 | 4.1 | NC** | NC** |
| | Film B after pasteurization | 3.9 | 3.7 | ND* | 3.1 | 3.6 | NC** | NC** |

*ND = not determined
**NC = not concerned (mixture too viscous to prepare the bilayer)

dimerized fatty alcohols comprising from 20 to 44 carbon atoms, or di(polyricinoleate) diols having formula (II):

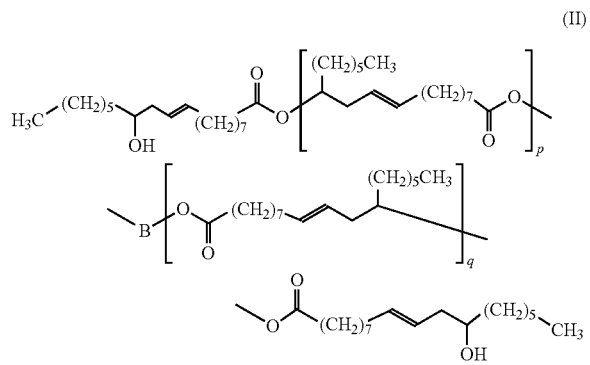

(II)

in which:
B represents a radical as defined above for A which is identical to or different from the radical represented by A;
p and q, which are identical or different, represent 0 or an integer ranging from 1 to 3 and are such that p+q varies from 0 to 3.

2. The two-component lamination adhesive as claimed in claim 1, wherein the Brookfield viscosity at 40° C. of the —NCO component after mixing (A) and (B) is within the range extending from 500 to 2000 mPa·s.

3. The two-component lamination adhesive as claimed in claim 1, wherein the Brookfield viscosity at 40° C. of the —NCO component after mixing (A) and (B) is within the range extending from 500 to 1500 mPa·s.

4. The two-component lamination adhesive as claimed in claim 1, wherein the divalent hydrocarbon radical A corresponds to a diol of formula:

 HO-A-OH (VI)

each of the 2 —OH functional groups of which is replaced with a single bond and the hydroxyl number $N_{OH}$ of which is within the range extending from 110 to 1808 mg KOH/g.

5. The two-component lamination adhesive as claimed in claim 1, wherein the divalent radical A corresponds to a diol of formula HO-A-OH (VI) chosen from:
(a) ethylene glycol;
(b) 1,4-butanediol;
(c) diethylene glycol;
(d) 1,4-cyclohexanedimethanol;
(e) a polypropylene glycol with a molar mass ranging from 400 g/mol to 1000 g/mol; or
(f) an aliphatic dimerized fatty alcohol comprising from 20 to 44 carbon atoms.

6. The two-component lamination adhesive as claimed in claim 1, wherein the divalent radical A corresponds to a diol of formula HO-A-OH (VI) chosen from an aliphatic dimerized fatty alcohol comprising from 35 to 37 carbon atoms or a polypropylene glycol with a molar mass of 400 g/mol.

7. The two-component lamination adhesive as claimed in claim 1, wherein the di(polyricinoleate) diols constituting the composition (B1) have a hydroxyl number $N_{OH}$ of between 35 and 65 mg KOH/g.

8. The two-component lamination adhesive as claimed in claim 1, wherein the composition formed of diols (B) comprises from 70 to 100% by weight of (B1) and from 0 to 30% weight/weight of (B2).

9. The two-component lamination adhesive as claimed in claim 1, wherein the polyisocyanate (A) is 2,4'- or 4,4'-diphenylmethane diisocyanate (MDI).

10. The two-component lamination adhesive as claimed in claim 1, wherein the —OH component is a composition comprising at least approximately 80% by weight of ricinoleic acid triglyceride.

11. The two-component lamination adhesive as claimed in claim 1, wherein the —NCO and —OH components are present in an amount corresponding to an —NCO/—OH molar ratio of approximately 2.

12. The two-component lamination adhesive as claimed in claim 1, wherein the di(polyricinoleate) diol of formula I is prepared by transesterifying a triglyceride of ricinoleic acid of formula III

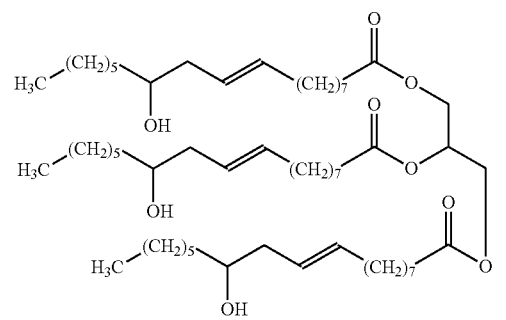

(III)

with an alcohol of formula $R^1$ OH, in which $R^1$ is $C_{1-4}$-alkyl, to produce a ricinoleic acid monoester of formula IV

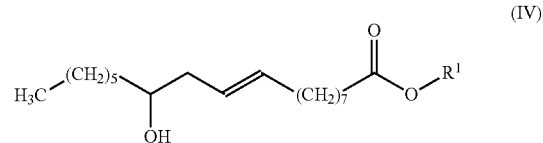

(IV)

transesterfying IV to obtain a polyricinoleate of formula V

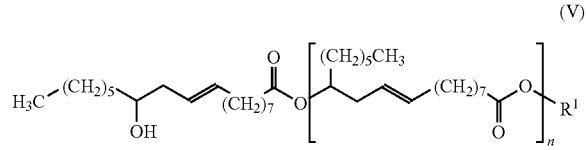

(V)

and transesterfying V with a compound of formula VI

 HO-A-OH (VI).

13. A multilayer film comprising 2 thin layers bonded to one another by a continuous layer, wherein the continuous layer is composed of the two-component lamination adhesive as defined in claim 1 in the crosslinked state and in an amount of less than 10 g/m².

14. A process for the continuous preparation of the multilayer film as defined in claim 13, comprising the sequential stages of:

(i) combining the —NCO and —OH components in the form of an adhesive mixture rendered flowable by heating,
(ii) coating a first thin layer with said adhesive mixture to form a substantially continuous layer,
(iii) laminating a second thin layer over the first thin layer with the coating formed in stage (ii), then
(iv) crosslinking the adhesive mixture.

15. The process according to claim 14, wherein heating in (i) is to a temperature of 40-80° C.

16. A flexible packaging material comprising the multilayer film as claimed in claim 13.

17. A two-component lamination adhesive comprising an —NCO component and an —OH component, wherein the —NCO component is obtained by reacting, according to a polyaddition reaction, a stoichiometric excess of an aromatic or aliphatic polyisocyanate (A) with a composition (B) formed of diols comprising, on the basis of the total weight of said composition:

from 60 to 100% by weight of a composition (B1) comprising one or more di(polyricinoleate) diols having a hydroxyl number $N_{OH}$ of between 30 and 70 mg KOH/g and formula (I):

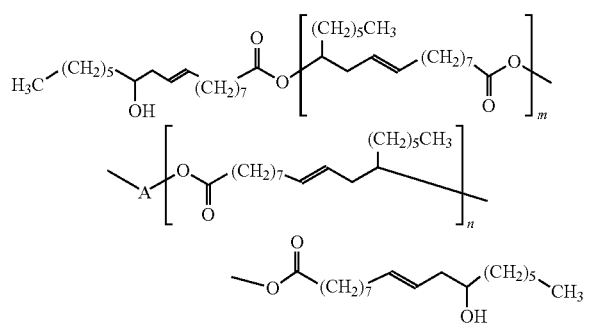

(I)

in which:
A represents a divalent hydrocarbon radical optionally interrupted by one or more oxygen or sulfur heteroatoms;

m and n, which are identical or different, represent 0 or an integer ranging from 1 to 11 and are such that m+n varies from 0 to 11; and from 0 to 40% by weight of a composition (B2) comprising diols having an $N_{OH}$ of between 72 and 360 mg KOH/g and which are:

dimerized fatty alcohols comprising from 20 to 44 carbon atoms, or di(polyricinoleate) diols having formula (II):

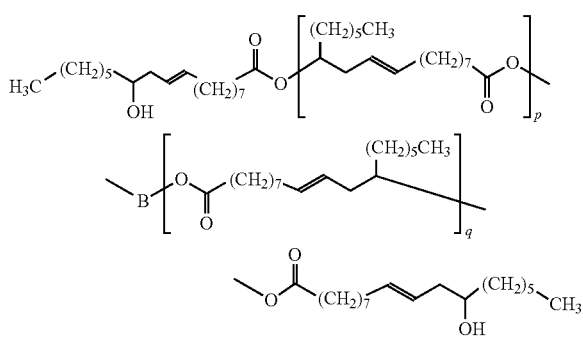

(II)

in which:
B represents a radical as defined above for A which is identical to or different from the radical represented by A;
p and q, which are identical or different, represent 0 or an integer ranging from 1 to 3 and are such that p+q varies from 0 to 3, wherein the —NCO component is obtained by reacting, according to a polyaddition reaction, an aromatic or aliphatic polyisocyanate (A) with a composition formed of diols (B), in an amount of (A) and (B) corresponding to a —NCO/—OH equivalent ratio of between 2 and 10.

* * * * *